(12) United States Patent  
Chen (10) Patent No.: US 8,520,300 B1
(45) Date of Patent: Aug. 27, 2013

(54) OPTICAL AMPLIFIER AND CONTROL METHOD FOR CONSTANT OUTPUT POWER

(75) Inventor: Guansan Chen, Fremont, CA (US)

(73) Assignee: Oplink Communications, Inc., Fremont, CA (US)

( * ) Notice: Subject to any disclaimer, the term of this patent is extended or adjusted under 35 U.S.C. 154(b) by 0 days.

(21) Appl. No.: 13/415,647

(22) Filed: Mar. 8, 2012

Related U.S. Application Data

(63) Continuation of application No. 12/133,331, filed on Jun. 4, 2008, now Pat. No. 8,134,776.

(51) Int. Cl.
*H04B 10/17* (2006.01)
*H04B 10/12* (2006.01)

(52) U.S. Cl.
USPC .................................... 359/341.42

(58) Field of Classification Search
USPC ................. 359/341.41, 341.42, 337
See application file for complete search history.

(56) References Cited

U.S. PATENT DOCUMENTS

| 5,784,192 | A | * | 7/1998 | Sugiyama et al. ....... 359/341.42 |
| 5,822,112 | A | | 10/1998 | Itou et al. |
| 5,892,616 | A | * | 4/1999 | Takahashi ................. 359/341.43 |
| 6,163,399 | A | | 12/2000 | Berg |
| 6,341,034 | B1 | | 1/2002 | Sun et al. |
| 6,366,393 | B1 | | 4/2002 | Feulner et al. |
| 6,396,625 | B1 | | 5/2002 | Nakaji |
| 6,407,854 | B1 | | 6/2002 | Shum |
| 6,490,080 | B2 | | 12/2002 | Cornelius et al. |
| 6,498,677 | B1 | | 12/2002 | Sun et al. |
| 6,661,570 | B2 | | 12/2003 | Nakaji |
| 6,668,137 | B1 | | 12/2003 | Cordina |
| 6,678,088 | B1 | | 1/2004 | Stummer et al. |
| 6,687,049 | B1 | | 2/2004 | Sulhoff et al. |
| 6,690,505 | B1 | * | 2/2004 | Ye ................... 359/337 |
| 6,690,506 | B2 | * | 2/2004 | Zahnley et al. ........ 359/337.11 |
| 6,798,567 | B2 | | 9/2004 | Feldman et al. |
| 7,068,423 | B2 | | 6/2006 | Vella et al. |
| 7,746,548 | B2 | | 6/2010 | Kilper et al. |
| 2002/0171917 | A1 | * | 11/2002 | Lelic et al. ............. 359/341.4 |
| 2003/0169487 | A1 | * | 9/2003 | Feldman et al. ......... 359/341.4 |
| 2004/0156094 | A1 | * | 8/2004 | Kawahara et al. ........ 359/333 |

FOREIGN PATENT DOCUMENTS

JP 2001237479 A * 8/2001

* cited by examiner

*Primary Examiner* — Eric Bolda
(74) *Attorney, Agent, or Firm* — Fish & Richardson P.C.

(57) ABSTRACT

This specification describes technologies relating to controlling optical amplifiers. In one implementation, an optical amplifier is provided. The optical amplifier includes a light amplifying medium for receiving an input optical signal and outputting an output amplified signal; a first measuring block for measuring a change in power of the input signal; a pump laser for supplying pump light to the light amplifying medium; and an electronic control for controlling the power of the pump light in response to the measured change in power of input signal to provide an output amplified signal having a substantially constant power for one or more changes in the power of the input signal.

18 Claims, 7 Drawing Sheets

OPTICAL AMPLIFIER AND CONTROL METHOD FOR CONSTANT OUTPUT POWER

CROSS-REFERENCE TO RELATED APPLICATIONS

This application is a continuation application of, and claims priority to, U.S. patent application Ser. No. 12/133,331, for Amplifier Output Control, which was filed on Jun. 4, 2008. The disclosure of the foregoing application is incorporated here by reference.

BACKGROUND

The present disclosure relates to optical fiber amplifiers.

Conventional optical fiber communications typically use dense wavelength division multiplexing (DWDM). DWDM allows a plurality of light streams having distinct and finely spaced wavelengths to propagate together, e.g., in a single-mode fiber. DWDM therefore provides an increased bandwidth for an optical fiber network.

DWDM implementations typically include the use of DWDM filters. DWDM filters can combine (e.g., multiplex) a plurality of separate light streams having finely spaced wavelengths into a single-mode fiber. DWDM filters can also separate (e.g., demultiplex) a combined light stream (e.g., a multiplexed signal) exiting, for example from a fiber, into a plurality of separate light streams each having one or more distinct, spaced wavelengths.

Conventional optical networks using DWDM typically include optical amplifiers capable of amplifying multiple light streams simultaneously. Rare earth doped fiber optical amplifiers, e.g., erbium doped fiber amplifiers (EDFA's), are commonly used in DWDM networks, although other types of optical amplifiers can also be used. When a multiplexed optical signal propagates through an EDFA, each light stream is amplified by a particular amount independently without interaction among the propagating light streams.

An erbium doped fiber (EDF) is a form of a single-mode fiber, having a core that is heavily doped with the rare earth element erbium. Conventional EDFA's include a pump laser. The pump laser provides a pump light to the erbium doped fiber to provide amplification. For example, when pump light at 980 nm or 1480 nm from a pump laser is transmitted into an EDF, erbium atoms absorb the pump light, pushing the erbium atoms into excited states. When stimulated by light streams, for example an input optical signal having particular wavelengths, (e.g., in a C-band (1528-1570 nm) or an L-band (1570-1620 nm)), the excited atoms return to a ground or lower state by stimulated emission. The stimulated emission has the same wavelength as that of the stimulating light (e.g., if the stimulating light has a wavelength of 1528 nm, the stimulated emission will also have a wavelength of 1528 nm). Therefore, the optical signal is effectively amplified as it is propagating through the EDF. Furthermore, the EDF typically amplifies all received light streams regardless of wavelength.

The power of the output amplified signal (i.e., output power, $P_{out}$) is a function of both the power of the input signal (i.e., input power, $P_{in}$) and the power of the pump light (i.e., pump power, $P_{pump}$). The output power and the input power are related by a gain G. The gain G is the ratio of the output power to the input power, or:

$$P_{out} = G \times P_{in}, \quad (1)$$

where gain G is proportional (linearly or non-linearly) to the pump power $P_{pump}$.

In some implementations, a given optical amplifier can be configured to maintain a constant gain during operation. For example, an input signal of an EDFA may initially have 20 separate channels or light streams. Later, the input signal may have 18 channels because two channels are dropped before the input signal enters the EDFA (e.g., using a demultiplexing DWDM filter). If the EDFA is supplied with the same pump power, the output power per channel will increase since a smaller number of channels share the same pumped energy. Similarly, if two channels are added such that the input signal now has 22 channels (e.g., using a multiplexing DWDM filter), without changing the pump power, the output power per channel will decrease. To keep the output power per channel constant, the pump power $P_{pump}$, can be adjusted. Consequently, the total output power $P_{out}$ varies as the total input power $P_{in}$ varies, but gain G (e.g., as calculated using Eq. (1)) is constant.

However, in some other implementations, a given optical amplifier is configured to maintain a constant output power $P_{out}$. For example, a DWDM signal can be demultiplexed such that an input signal to an EDFA has only one channel. This single channel input signal is amplified by the EDFA, and the amplified output signal from the EDFA is fed to a detector.

The output power level should match the sensitivity and the dynamic range of the detector. If the output power is too low, it cannot be properly detected. Additionally, if the output power is too high, it can cause damage to the detector. When the input power varies, for example, as a result of channels being added or dropped, e.g., in a stage in the network prior to the current EDFA, the output power should be maintained in order to provide the same performance. An abrupt change in the input power can also be caused, for example, by network reconfigurations, failures or recovery from failures. Thus, the gain G varies as the total input power $P_{in}$ varies, but the total output power $P_{out}$ in Eq. (1) is constant. In order to keep the output power $P_{out}$ constant, the pump power $P_{pump}$ is adjusted, typically using a detected $P_{out}$.

In another example, in some DWDM systems, an input signal to an EDFA can have more than one channel. The output amplified signal from the EDFA is fed as an input signal to the next stage in the network. The total power of the input signal to the next stage needs to be at a level predetermined for that stage. Therefore, the EDFA again has to provide a constant output power $P_{out}$ instead of a constant gain G.

Either a constant gain or a constant output power can be provided by properly controlling the pump power. However, an EDFA has a finite response time to the pump power change. Consequently, transient spikes can occur in the output power that can include a power overshoot or undershoot or both.

SUMMARY

This specification describes technologies relating to controlling optical amplifiers.

In general, one aspect of the subject matter described in this specification can be embodied in an optical amplifier including a light amplifying medium for receiving an input optical signal and outputting an output amplified signal; a first measuring block for measuring a change in power of the input signal; a pump laser for supplying pump light to the light amplifying medium; and an electronic control for controlling the power of the pump light in response to the measured change in power of input signal to provide an output amplified signal having a substantially constant power following a transient period for one or more changes in the power of the input signal. Other embodiments of this aspect include systems and methods.

These and other embodiments can optionally include one or more of the following features. The optical amplifier can further include a second measuring block for measuring the level of power of the output signal, where the electronic control additionally controls the power of the pump light in response to the measured level of power of the output signal to provide the output amplified signal having the substantially constant power. The light amplifying medium can be one or more erbium doped fibers. The input signal can include one or more channels, each channel having one or more distinct wavelengths. The first measuring block can include a first photo-detector, where the first photo-detector receives a tapped portion of the input optical signal.

In general, one aspect of the subject matter described in this specification can be embodied in a method of controlling the output power of an optical amplifier including the steps of measuring change in input power and, in response to the measured change in input power, controlling the optical amplifier such that a power of an output amplified signal is substantially constant for one or more changes in the input power. Other embodiments of this aspect include systems and apparatus.

These and other embodiments can optionally include one or more of the following features. Controlling the optical amplifier can include controlling a power of a pump light supplied to a pump laser such that the power of the output amplified signal is returned to substantially a power prior to the change in input power. Controlling the optical amplifier can include decreasing the power of the pump light when the measured change in input power is positive and larger than a specified transient threshold. Controlling the optical amplifier can include increasing the power of the pump light when the measured change in input power is negative and an absolute value of the change is larger than a specified transient threshold. Controlling the optical amplifier further includes providing a short transient time for returning the output amplified signal to substantially a same power as before the change in input power.

The method can further include measuring a power of the output amplified signal; and using both the power of the output amplified signal with the change in the input signal to control the power of pump light. Controlling the optical amplifier can include decreasing the power of the pump light when a measured power of the output amplified signal is larger than a calculated sum of a target output power and a specified tolerance value. Controlling the optical amplifier can include increasing the power of the pump light when a measured power of the output amplified signal is less than a calculated difference between a target output power and a specified tolerance value. The change in input power can be measured including calculating a difference between two detected input power levels separated by a specified time interval. The method can further include using the pump laser to provide an amplifying light to a light amplifying medium, the light amplifying medium including one or more erbium doped fibers. The input power can be a total power of an input signal that includes one or more channels where each channel includes one or more distinct wavelengths.

In general, one aspect of the subject matter described in this specification can be embodied in methods including the steps of monitoring an input signal received at an optical amplifier; detecting a change in a power of the input signal; and using the detected change in the input signal to control the optical amplifier such that a power of an output amplified optical signal remains substantially constant following a specified transient period. Other embodiments of this aspect include systems and apparatus.

These and other embodiments can optionally include one or more of the following features. Controlling the optical amplifier can include decreasing the power of a pump light when the measured change in input power is positive and larger than a specified transient threshold. Controlling the optical amplifier can include increasing the power of a pump light when the measured change in input power is negative and an absolute value of the change is larger than a specified transient threshold.

The method can further include monitoring the power of the output amplified optical signal; and using the detected change in the power of the input signal and monitored power of the output amplified signal to control the optical amplifier. Controlling the optical amplifier can include decreasing a power of a pump light when a measured power of the output amplified signal is larger than a calculated sum of a target output power and a specified tolerance value. Controlling the optical amplifier can include increasing a power of a pump light when a measured power of the output amplified signal is less than a calculated difference between a target output power and a specified tolerance value.

Particular embodiments of the subject matter described in this specification can be implemented to realize one or more of the following advantages. The output power of an optical amplifier can be maintaining at a predetermined level regardless of changes in input power. The output power can be maintained while resulting in a relatively small overshoot and/or undershoot and short transient time. A bit error rate and transient time can be reduced relative to a conventional optical amplifier.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference symbols in the various drawings indicate like elements.

DETAILED DESCRIPTION

Figure 1:
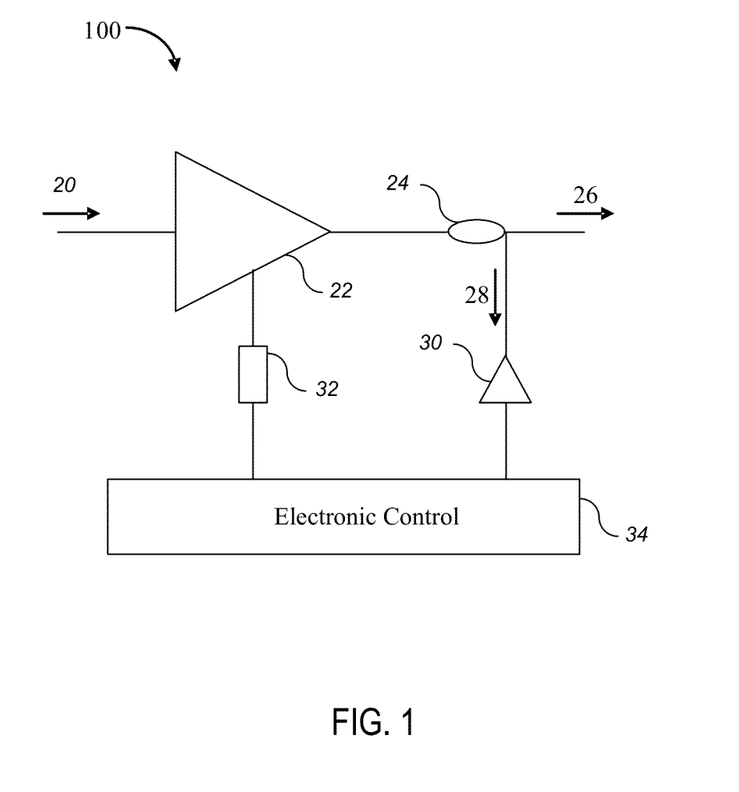
FIG. 1 is a block diagram of a conventional optical amplifier.

FIG. 1 shows a block diagram of a conventional optical amplifier 100. The conventional output-power-controlled optical amplifier 100 includes an EDFA 22, a photo-detector 30, a pump laser 32, and an electronic control 34.

An input optical signal 20 that can include one or more channels is input to the EDFA 22. An output amplified optical signal 26 from the EDFA 22 is tapped by a tap 24 to the photo-detector 30. The photo-detector 30, using a tapped optical signal 28, measures the total output power $P_{out}$ of the optical amplifier 100. The tap 24 can be, for example, a fused fiber coupler. In some implementations, the tap 24 directs substantially 1% to 5% of the output amplified signal to the photo-detector 30. The majority of the output amplified signal 26 passes through the tap 24 and is fed to a signal detector (not shown) or to a next stage in the network (not shown). The electronic control 34 controls the power of the pump laser 32.

Figure 2:
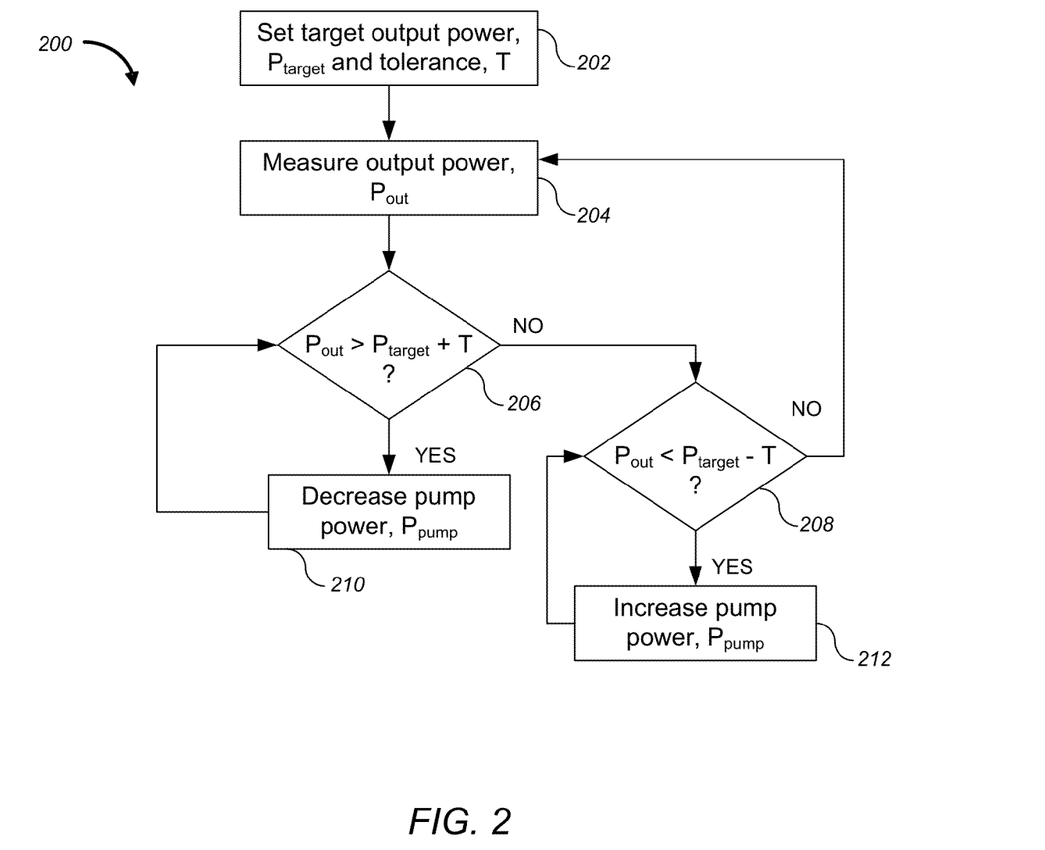
FIG. 2 shows a flow diagram of a conventional output power control process for the optical amplifier of FIG. 1.

FIG. 2 shows a flow diagram 200 of a conventional output power control process for an optical amplifier (e.g., optical amplifier 100). The process 200 can be performed by a controller, for example, by the electronic control 34 of FIG. 1. At step 202 a target output power $P_{target}$ and a tolerance T are set. For example, an input can be received providing instructions to the controller to change the existing $P_{target}$ and/or T.

At step 204 the photo-detector 30 measures the output power $P_{out}$. At step 206 the measured output power $P_{out}$ is compared to the sum of the target output $P_{target}$ and tolerance T. If $P_{out} > P_{target} + T$, the power of a pump laser (e.g., pump laser 32) is decreased to decrease the power of pump light $P_{pump}$ (step 210), and the process is iterated back to step 206 again. In some implementations, the decreasing step of the pump power $P_{pump}$ is determined by the value of $[P_{out} - (P_{target} + T)]$. In some other implementations, the decreasing step can be a fixed value.

If $P_{out}$ is not greater than $P_{target} + T$, then the process goes to step 208. At step 208, if $P_{out} < P_{target} - T$, the power of the pump laser is increased by an incremental step value to increase the power of pump light $P_{pump}$ and the process returns to step 208. In some implementations, the incremental step of the pump power $P_{pump}$ is determined by the value of $[(P_{target} - T) - P_{out}]$. In some other implementations, the incremental step can be a fixed value.

When the output power, $P_{out}$ is no longer less than $P_{target} - T$, the process returns to step 204 measuring a new output power $P_{out}$.

Because there is a delay typically from 1-100 μs from the moment the pump light is injected into the EDF to the moment stimulated emission occurs to amplify the signal light, the optical amplifier will overshoot or undershoot the output power for some period of transient time.

Figure 3A:
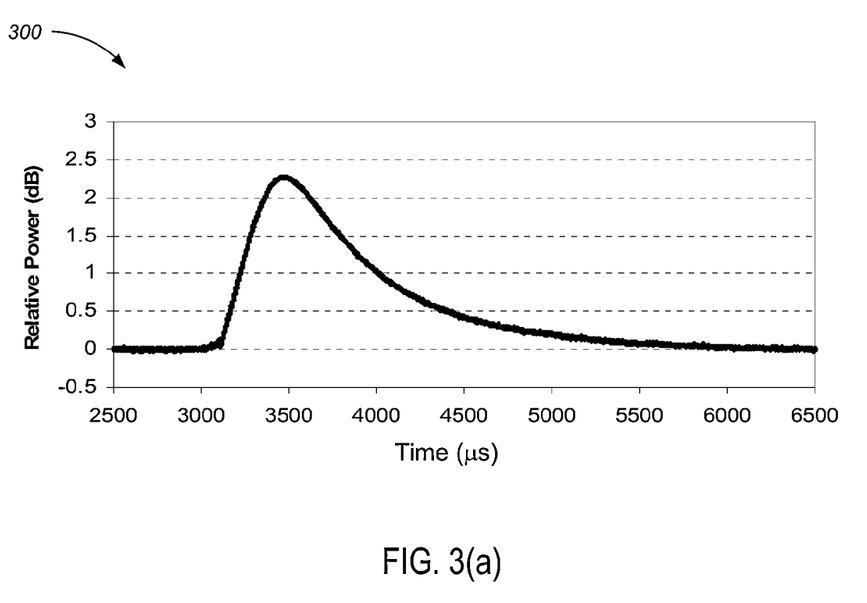
FIG. 3(a) shows an example display of a conventionally controlled output power of an optical amplifier when the input power suddenly increases by 5 dB.

FIG. 3(a) shows an example display 300 of a conventionally controlled output power of an optical amplifier (e.g., optical amplifier 100) calculated in the event the input power suddenly increases by 5 dB. An overshoot peak is shown of substantially 2.3 dB, and the transient time is substantially 2500 μs. The transient time is the time from when the output power begins to change to when the output power returns to a stable target level (e.g., 0 dB relative power).

Figure 3B:
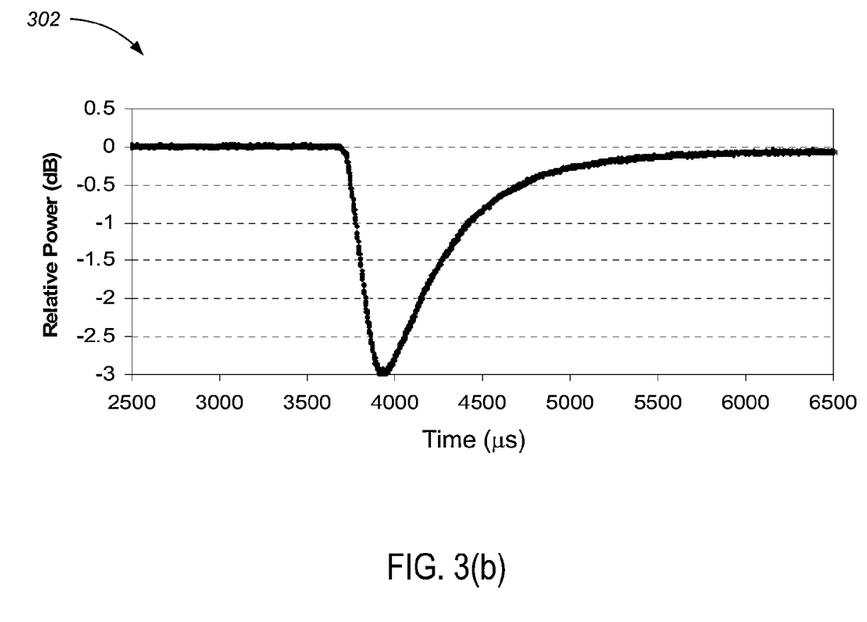
FIG. 3(b) shows an example display of a conventionally controlled output power of an optical amplifier when the input power suddenly decreases by 5 dB.

FIG. 3(b) shows another example display 302 of the same conventionally controlled optical amplifier calculated in the event the input power suddenly decreases by 5 dB. The undershoot value is about −3 dB and the transient time is also about 2500 μs. To accommodate the overshoot and undershoot without any resulting damage or other problems, a detector or a network requires a large power margin, which may substantially increase in cost. Furthermore, the long transient time can increase the bit-error-rate (BER) of the optical network.

Figure 4:
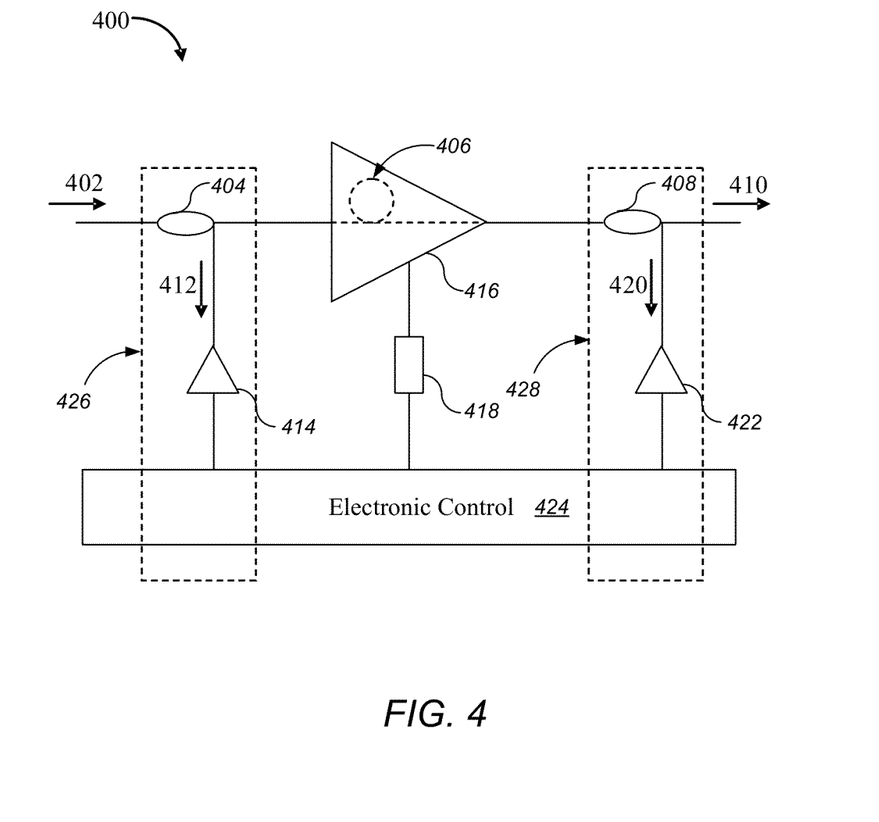
FIG. 4 shows a block diagram of an example optical amplifier for providing a constant-power output signal for changes in input power.

FIG. 4 shows a block diagram of an optical amplifier 400 for providing a constant-power output signal for changes in input power. The optical amplifier 400 includes a light amplifying medium 406 within an EDFA 416, a first measuring block 426 for measuring the level of the input power, and a second measuring block 428 for measuring the level of the output power. The first measuring block 426 includes a first tap 404 and a first photo-detector 414. The second measuring block 428 includes a second tap 408 and a second photo-detector 422. The optical amplifier 400 also includes a pump laser 418 for supplying pump energy to the light amplifying medium 406, and an electronic control 424 for controlling the power of the pump light.

In operation, an input optical signal 402 including one or more channels (e.g., each having one or more distinct wavelengths) is tapped by the first tap 404 to provide a first tapped optical signal 412 to the first photo-detector 414. The first photo-detector 414, using the first tapped optical signal 412, measures the total input power $P_{in}(t)$.

The majority of the input signal 402 is passed through the first tap 404 and is incident to the light amplifying medium 406 in EDFA 416 (e.g., EDFA 416 can be similar to EDFA 22 of FIG. 1). The light amplifying medium 406 can include one or more erbium doped fibers. The EDFA 416 can also include other optical elements, for example, couplers, filters, variable optical attenuators, isolators, and other components.

The pump laser 418 supplies the light amplifying medium 406 in the EDFA 416 with optical energy to amplify the input optical signal 402. An output amplified optical signal 410 amplified by the light amplifying medium 406 and leaving the EDFA 416 is tapped by the second tap 408 to provide a second tapped optical signal 420 to the second photo-detector 422. The second photo-detector 422, using the second tapped optical signal 420, measures the total output power $P_{out}$ from the EDFA 416. The majority of the output amplified signal 410 is passed through the second tap 408 and is forwarded to a signal detector (not shown) or output to a next stage in the optical network (not shown).

The first and second taps 404 and 408 can be, for example, fused fiber couplers. In some implementations, each tap directs substantially 1% to 5% of the optical signal to the respective photo-detector.

The first and second photo-detectors 414 and 422, send outputs $P_{in}(t)$ and $P_{out}(t)$, respectively, to the electronic control 424. The electronic control 424 controls the pump power $P_{pump}(t)$ in response to the detected values of $P_{in}(t)$ and $P_{out}(t)$ as disclosed below.

Figure 5A:
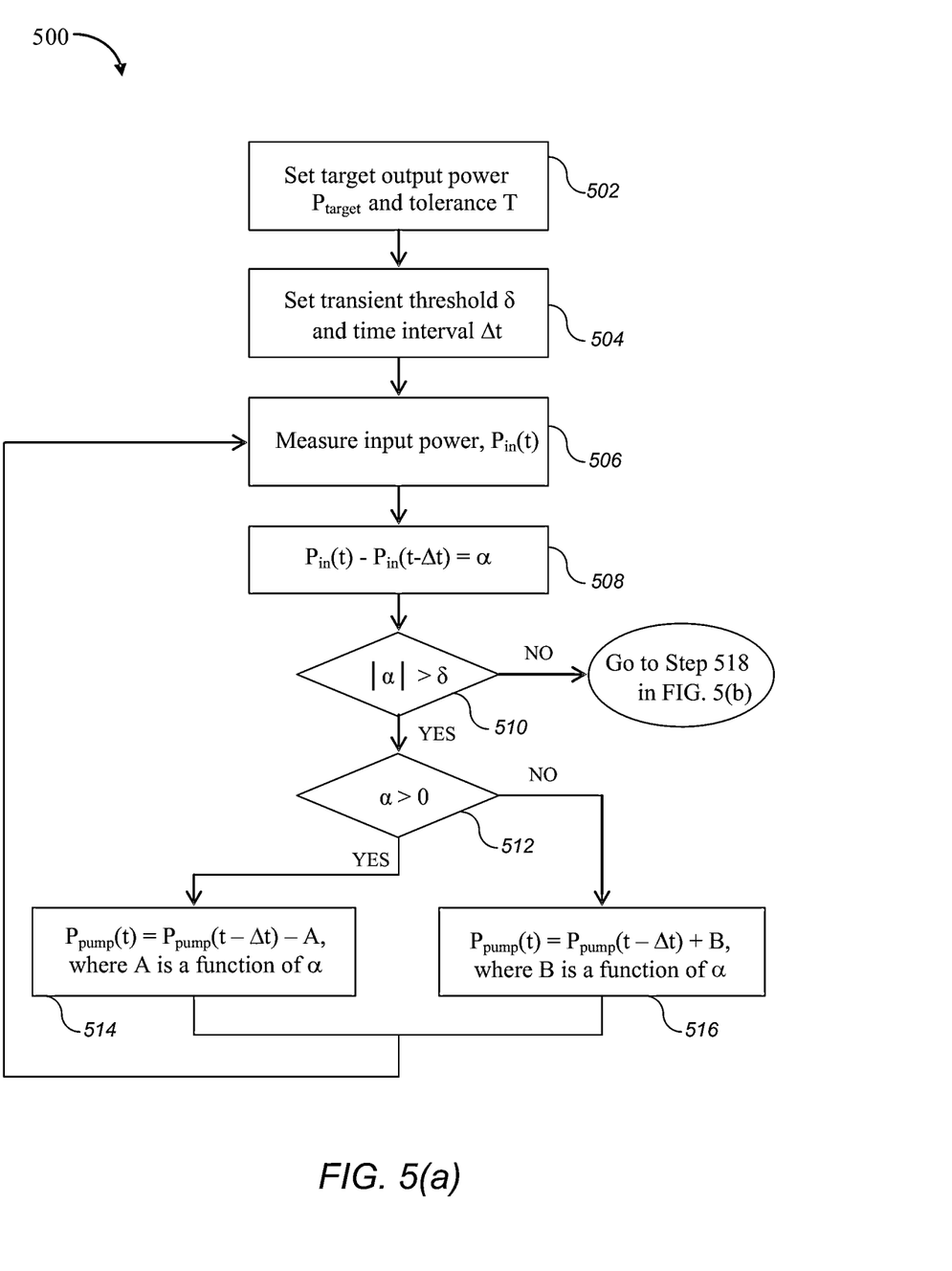
FIG. 5(a) shows the first part of a flow diagram of an example output power control process in response to the change in input power.

FIG. 5(a) shows a first part of a flow diagram 500 of an example output power control process for the optical amplifier 400 in response to a change in input power. The process 500 can be performed by an electronic control, for example, electronic control 424 as part of optical amplifier 400 of FIG. 4.

At step 502 a specific target output power $P_{target}$ and a tolerance T are specified. Additionally, at step 504 an input transient threshold δ and input sampling time interval Δt are also specified. For example, an input can be received that instructs the electronic control to change one or both of the existing $P_{target}$ and T values. Similarly, another input can be received that instructs an electronic control to change one or both of the existing δ and Δt values. In some implementations, the input sampling time interval Δt can have values ranging from 0.1-10 μs.

At step 506 the input power $P_{in}(t)$ is measured, for example, using a photo-detector (e.g., first photo-detector 414). At step

508 the detected input power $P_{in}(t)$ is compared to a previous input power $P_{in}(t-\Delta t)$. A change in input power, $\alpha$, is computed as:

$$\alpha = P_{in}(t) - P_{in}(t-\Delta t). \qquad (2)$$

At step 510 the change in input power $\alpha$ is compared to the input transient threshold $\delta$. If the absolute value of $\alpha$ is greater than $\delta$, $|\alpha|>\delta$, then the process continues to step 512. At step 512 a determination is made as to whether the change in input power is greater than zero, $\alpha>0$. If the change in input power is greater than zero, at step 514 the power of a pump laser (e.g., pump laser 418) is decreased to decrease the power of pump light $P_{pump}$ as follows:

$$P_{pump}(t) = P_{pump}(t-\Delta t) - A, \qquad (3)$$

where A has a value calculated as a function of $\alpha$, and the process returns to step 506 where a new input power, i.e., new $P_{in}(t)$ is measured. The previous $P_{in}(t)$ then becomes the new $P_{in}(t-\Delta t)$ used in determining whether a change in input power has occurred.

If the change in input power is not greater than zero at step 512, then at step 516 the power of the pump laser is increased to increase the power of pump light $P_{pump}$ as follows:

$$P_{pump}(t) = P_{pump}(t-\Delta t) + B, \qquad (4)$$

where B has a value calculated as a function of $\alpha$, and the process returns to step 506 where a new input power, i.e., new $P_{in}(t)$ is measured. The previous $P_{in}(t)$ then becomes a new $P_{in}(t-\Delta t)$ used in determining whether a change in input power has occurred.

In some implementations, the values of A and B provide decreasing and increasing incremental steps and are pre-calculated and stored in a lookup table as shown in Table 1 below, where $\alpha 1, \alpha 2, \alpha 3, \ldots, A1, A2, A3, \ldots, B1, B2, B3, \ldots$, are positive numbers.

TABLE 1

| $\alpha$ | A | $\alpha$ | B |
|---|---|---|---|
| $\alpha 1$ | A1 | $-\alpha 1$ | B1 |
| $\alpha 2$ | A2 | $-\alpha 2$ | B2 |
| $\alpha 3$ | A3 | $-\alpha 3$ | B3 |
| • | • | • | • |
| • | • | • | • |

In some implementations, if $\alpha=\alpha 1$ then $A=A1$, if $\alpha=\alpha 2$ then $A=A2$, and so on. Similarly, if $\alpha=-\alpha 1$ then $B=B1$, if $\alpha=-\alpha 2$ then $B=B2$, and so on. If $\alpha 1 < \alpha < \alpha 2$, then A can be interpolated from A1 and A2, and so on. Similarly, if $-\alpha 2 < \alpha < -\alpha 1$, then B can be interpolated from B2 and B1, and so on.

Figure 5B:
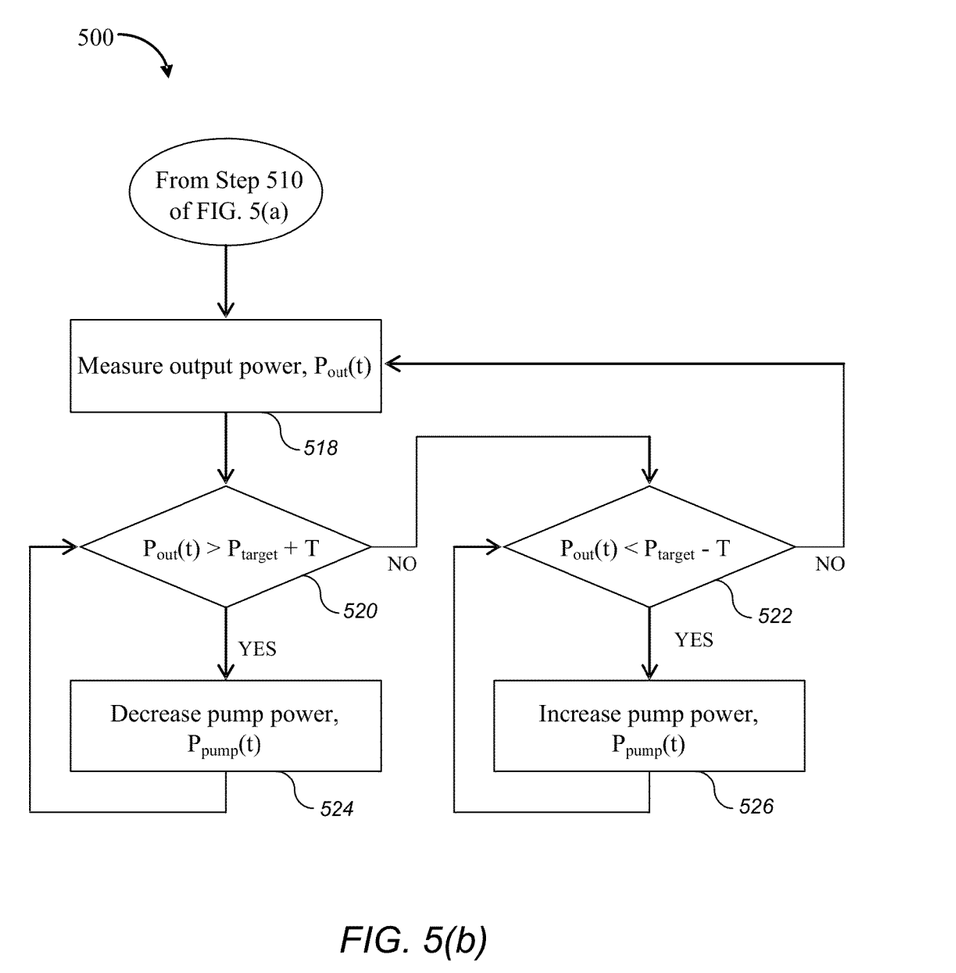
FIG. 5(b) shows the second part of a flow diagram of an example output power control process in response to the level of output power.

At step 510, if the determination of whether ($|\alpha|>\delta$) results in "no", the process goes to step 518, which is shown in FIG. 5(b).

FIG. 5(b) shows a second part of the flow diagram 500 of an example output power control process for an optical amplifier in response to the level of output power. At step 518 the output power $P_{out}(t)$ from the optical amplifier is measured, for example, using a second photo-detector (e.g., second photo-detector 422). At step 520 the measured output power $P_{out}(t)$ is compared to the sum of the target output power $P_{target}$ and tolerance T. If $P_{out}(t)>P_{target}+T$, at step 524 the power of the pump laser is decreased to decrease the power of pump light $P_{pump}$ and the process is returned to step 520 to again compare the output power with the sum of the target output power and tolerance value.

In some implementations, the decreasing step of the pump power resulting at step 524 is determined by a $\beta$ value, where $\beta$ is given by:

$$\beta = |P_{out}(t) - P_{target}|. \qquad (5)$$

A look up table similar to that shown in Table 1 can be used to identify the value of the decreasing step. In some implementations, the decreasing step is a fixed value regardless of $\beta$.

At step 520 if $P_{out}(t)$ is not greater than $P_{target}+T$, then at step 522 a determination is made as to whether $P_{out}(t)<P_{target}-T$. If $P_{out}(t)<P_{target}-T$, then at step 526 the power of the pump laser is increased to increase the power of pump light $P_{pump}$ and the process returns to step 522 to determine again whether $P_{out}(t)$ is still less than $P_{target}-T$.

In some implementations, the incremental step of the pump power is determined by the value of $\beta$ in Eq. (5), and a table similar to Table 1 can be provided. In some implementations, the incremental step is a fixed value regardless of $\beta$. If $P_{out}(t)$ is not less than ($P_{target}-T$) then process returns to step 518 measuring new output power, i.e., a new $P_{out}(t)$.

Because the change in input power is detected before an input signal enters an EDFA and the pump power is adjusted accordingly when the change is detected, the generated overshoot or undershoot at the output power can be significantly reduced. Furthermore, the transient at the power output can be substantially minimized, which in turn can reduce the BER of the network.

Figure 6A:
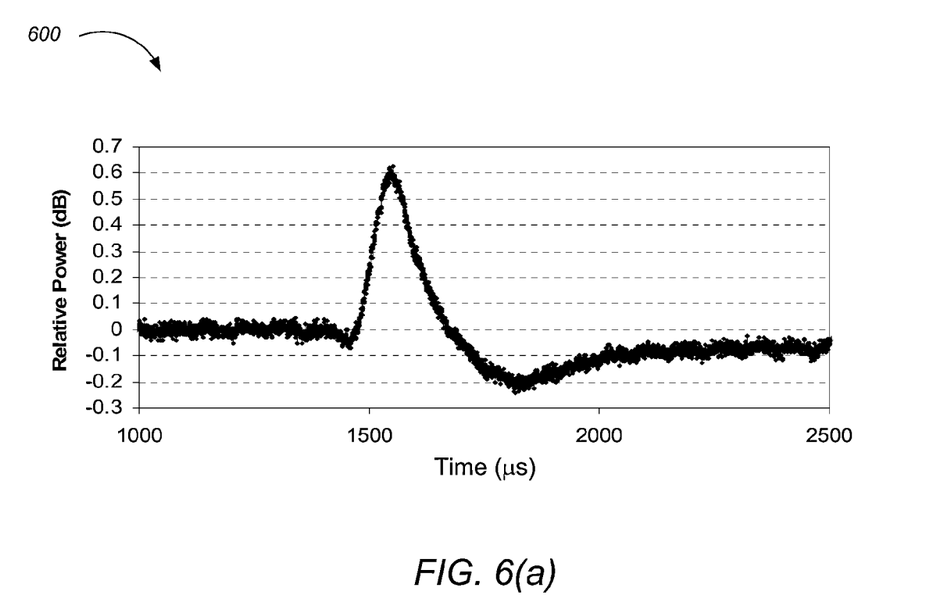
FIG. 6(a) shows an example display of a controlled output power of an optical amplifier in response to a 5 dB increase in input power.

FIG. 6(a) shows an example display 600 of a controlled output power of an optical amplifier in response to the change in input power using an optical amplifier (e.g., optical amplifier 400 of FIG. 4). The display 600 shows the controlled output power level calculated in the event the input power suddenly increases (e.g., by 5 dB). An overshoot peak is shown of substantially 0.6 dB. Additionally, the display 600 shows a transient time of less than or equal to 500 µs.

Figure 6B:
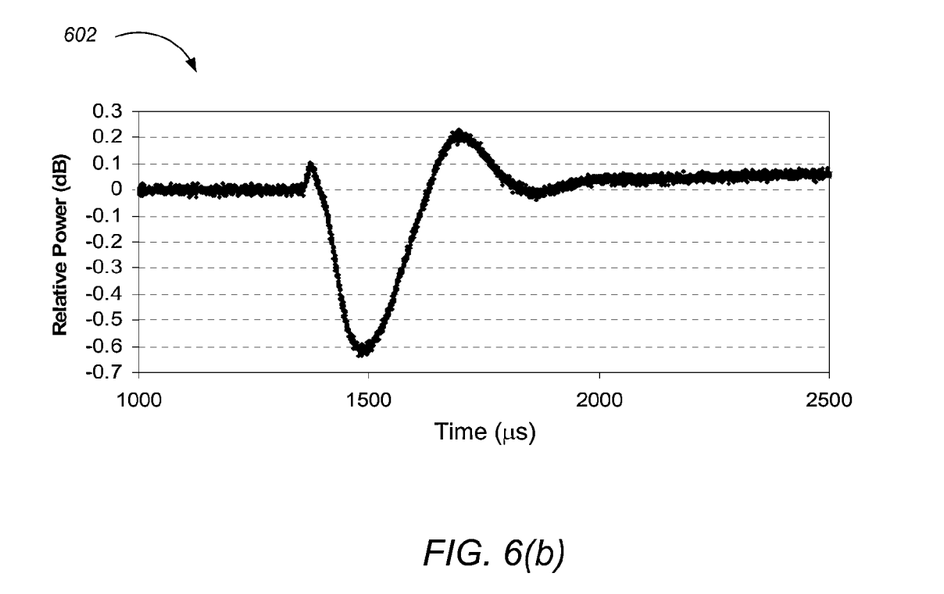
FIG. 6(b) shows an example display of a controlled output power of an optical amplifier in response to a 5 dB decrease in input power.

FIG. 6(b) shows another example display 602 of the same optical amplifier calculated in response to a decrease in input power (e.g., a sudden decrease by 5 dB). An undershoot valley is shown of substantially −0.6 dB. Additionally, the display 602 shows a transient time less than or equal to 500 µs. Compared with FIGS. 3(a) and (b), the overshoot and undershoot are suppressed by substantially 1.7 dB (1.5×) and 2.4 dB (1.7×), respectively. Table 2 below shows a comparison of output power obtained by a conventional control process (e.g., as shown in FIGS. 1-3), the optical amplifier and control process shown in FIGS. 4-6, and an optical amplifier having no control process.

TABLE 2

| | | No Output Power Control | Conventional Output Power Control No output power change after transient (2500 µs) | | Output Power Control Based on Change in Input Power and Level of Output Power No output power change after transient (500 µs) | |
|---|---|---|---|---|---|---|
| Input | | | | | | |
| Power Change | Power Change | Transient Overshoot | Transient Overshoot | Transient Undershoot | Transient Overshoot | Transient Undershoot |
| +5 dB | +5 dB | +2.3 dB | | — | +0.6 dB | — |
| −5 dB | −5 dB | | — | −3 dB | — | −0.6 dB |

The overshoot and undershoot produced by the disclosed control process based on the change in input power and the level of output power are smaller than that of conventional process. Thus, to accommodate the overshoot and undershoot, a smaller power margin is required, which may substantially reduce a cost of the system. Furthermore, the transient time is substantially shortened from 2500 μs to 500 μs, which can reduce the bit-error-rate (BER) of the network.

A number of embodiments of the invention have been described. Nevertheless, it will be understood that various modifications may be made without departing from the spirit and scope of the invention. Accordingly, other embodiments are within the scope of the following claims.

What is claimed is:

1. An optical amplifier comprising:
a light amplifying medium for receiving an input optical signal and outputting an output amplified signal;
a first measuring block for measuring a change in power of the input signal;
a pump laser for supplying pump light to the light amplifying medium; and
an electronic control for controlling the power of the pump light in response to determining that the measured change in power of the input signal is greater than a specified input transient threshold to provide an output amplified signal having a substantially constant power following a transient period for one or more changes in the power of the input signal, wherein controlling the power of the pump light supplied by the pump laser includes decreasing the power of the pump light by an amount based on a set of precomputed incremental steps relating particular values for decreasing the power of the pump light with corresponding changes in input power.

2. The optical amplifier of claim 1, further comprising:
a second measuring block for measuring the level of power of the output signal, where the electronic control additionally controls the power of the pump light in response to the measured level of power of the output signal to provide the output amplified signal having the substantially constant power.

3. The optical amplifier of claim 1, where the light amplifying medium is one or more erbium doped fibers.

4. The amplifier of claim 1, where the input signal includes one or more channels, each channel having one or more distinct wavelengths.

5. The optical amplifier of claim 1, where the first measuring block includes a first photo-detector, where the first photo-detector receives a tapped portion of the input optical signal.

6. The optical amplifier of claim 1, wherein measuring the change in change in power of the input signal includes calculating a difference between two detected input power levels separated by a specified time interval.

7. A method of controlling the output power of an optical amplifier comprising:
measuring a change in input power; and
in response to determining that the measured change in the input power is greater than a specified input transient threshold, controlling the optical amplifier such that a power of an output amplified signal is substantially constant for one or more changes in the input power, wherein controlling the optical amplifier includes:
controlling a power of a pump light supplied by a pump laser including decreasing the power of the pump light by an amount based on a set of precomputed incremental steps relating particular values for decreasing the power of the pump light with corresponding changes in input power.

8. The method of claim 7, wherein the power of a pump light supplied by a pump laser is controlled such that the power of the output amplified signal is returned to substantially a power prior to the change in input power.

9. The method of claim 8, wherein controlling the optical amplifier further includes increasing the power of the pump light when the measured change in input power is negative and an absolute value of the change is larger than a specified transient threshold.

10. The method of claim 7, wherein controlling the optical amplifier further includes providing a short transient time for returning the output amplified signal to substantially a same power as before the change in input power.

11. The method of claim 7, where the change in input power is measured including calculating a difference between two detected input power levels separated by a specified time interval.

12. The method of claim 7, further comprising:
using the pump laser to provide an amplifying light to a light amplifying medium, the light amplifying medium including one or more erbium doped fibers.

13. The method of claim 7, where the input power is a total power of an input signal that includes one or more channels where each channel includes one or more distinct wavelengths.

14. A method of controlling the output power of an optical amplifier comprising:
measuring a change in input power; and
in response to the measured change in the input power, controlling the optical amplifier such that a power of an output amplified signal is substantially constant for one or more changes in the input power including decreasing the power of the pump light when a power of the output amplified signal is larger than a calculated sum of a target output power and a specified tolerance value.

15. The method of claim 14, further comprising:
measuring the power of the output amplified signal; and
using both the power of the output amplified signal with the change in the input signal to control the power of pump light.

16. The method of claim 14, where controlling the optical amplifier includes increasing the power of the pump light when a measured power of the output amplified signal is less than a calculated difference between a target output power and a specified tolerance value.

17. The method of claim 14, where the change in input power is measured including calculating a difference between two detected input power levels separated by a specified time interval.

18. A method comprising:
monitoring an input signal received at an optical amplifier;
detecting a change in a power of the input signal; and
when it is determined that the absolute value of the detected change in the input signal is greater than a specified transient threshold, using the detected change in the input signal to control the optical amplifier including decreasing the power of the pump light if the detected change in the power of the input signal is an increase in input power and larger than the specified transient threshold and increasing the power of the pump light if the detected change in the power of the input signal is a decrease in input power and larger than the specified transient threshold;
when it is determined that the absolute value of the detected change in the input signal is not greater than the specified transient threshold, comparing a measured output power to a sum of a target output power and a tolerance and determining whether to modify the power of the pump light based on the comparison.

* * * * *